United States Patent
Murakami et al.

(10) Patent No.: US 8,155,186 B2
(45) Date of Patent: Apr. 10, 2012

(54) BIT STREAM RECORDING MEDIUM, VIDEO ENCODER, AND VIDEO DECODER

(75) Inventors: Tomokazu Murakami, Kokubunji (JP); Junichi Kimura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1034 days.

(21) Appl. No.: 11/659,817

(22) PCT Filed: Aug. 11, 2004

(86) PCT No.: PCT/JP2004/011795
§ 371 (c)(1),
(2), (4) Date: Apr. 11, 2008

(87) PCT Pub. No.: WO2006/016418
PCT Pub. Date: Feb. 16, 2006

(65) Prior Publication Data
US 2008/0317125 A1  Dec. 25, 2008

(51) Int. Cl.
*H04N 11/02* (2006.01)
(52) U.S. Cl. ............. 375/240.12; 375/240.15
(58) Field of Classification Search .......... None
See application file for complete search history.

(56) References Cited

U.S. PATENT DOCUMENTS

| | | | | |
|---|---|---|---|---|
| 5,828,787 A * | 10/1998 | Uehara | | 382/236 |
| 6,560,282 B2 * | 5/2003 | Tahara et al. | | 375/240.02 |
| 6,978,082 B1 * | 12/2005 | Amano | | 386/345 |
| 7,139,316 B2 * | 11/2006 | Yoshinari | | 375/240.25 |
| 7,555,042 B2 * | 6/2009 | Kim et al. | | 375/240.12 |
| 2009/0010334 A1 * | 1/2009 | Ueda et al. | | 375/240.15 |

FOREIGN PATENT DOCUMENTS

| | | |
|---|---|---|
| JP | 2-274189 A | 11/1990 |
| JP | 2-281885 A | 11/1990 |
| JP | 6-133262 A | 5/1994 |
| JP | 6-339111 A | 12/1994 |
| JP | 8-280024 A | 10/1996 |
| JP | 10-032787 | 2/1998 |
| JP | 11-98513 A | 4/1999 |

OTHER PUBLICATIONS

English translation of related part of Japanese Notification of Reasons for Refusal issued in Japanese Patent Appliction No. JP 2006-531105 dated Aug. 17, 2010.

* cited by examiner

*Primary Examiner* — Phirin Sam
(74) *Attorney, Agent, or Firm* — McDermott Will & Emery LLP

(57) ABSTRACT

A conventional coding method has a problem that, for frame-by-frame reverse playback, data must be once decoded in a forward direction and thus a larger volume of data must be processed and a larger volume of memory is required. By recoding a forward predicted picture and a backward predicted picture for a frame in a bit stream, the bit stream can be played back reversely frame by frame easily. By the use of this method for multi-viewpoint video coding, a device that can play back pictures while varying the viewpoint in real time is realized.

12 Claims, 7 Drawing Sheets

BIT STREAM RECORDING MEDIUM, VIDEO ENCODER, AND VIDEO DECODER

RELATED APPLICATIONS

This application is the U.S. National Phase under 35 U.S.C. §371 of International Application No. PCT/JP2004/011795, filed on Aug. 11, 2004, the disclosures of which Application are incorporated by reference herein.

TECHNICAL FIELD

The present invention relates to a medium which records a video bit stream, a video encoder, a video decoder, a video encoding method, and a video decoding method and more particularly to devices which use these, such as video recorders, video players, mobile phones, and digital cameras.

BACKGROUND ART

As methods of recording and transmitting video and sound information, encoding methods such as MPEG (Moving Picture Experts Group) have been established and MPEG-1, MPEG-2, and MPEG-4 specifications are available as international standard encoding methods. Also, specifications for improved coding efficiency, such as H.264/AVC (Advanced Video Coding), have been formulated. These methods are used as encoding methods in digital satellite broadcasting, DVDs, mobile phones and digital cameras.

On the other hand, in such applications, a video may be played back in a direction reverse to the order in which pictures were captured. As a means to produce a stream which can be played back in the reverse direction, a technique of achieving reverse playback using only intra-coded frames and bi-directional predicted frames is available (for example, JP-A No. H8-280024).

The above method has a problem that in decoding a transmitted stream on the receiving side, a large volume of memory for decoding is needed to play back a video from a desired point in the reverse direction. Let's suppose that a multi-viewpoint video captured by a multi-viewpoint object capturing system (301) as shown in FIGS. 3A and 3B is encoded by the conventional method. In this case, a picture at each viewpoint corresponds to a frame in a normal stream in the time direction. In FIGS. 3A and 3B, I represents an intra-coded frame, P a forward predicted frame, and B a bi-directional predicted frame. For example, if the picture at point B6 is to be played back, first P4 should be decoded (as derived) from I1, then B6 should be decoded from P4 and I7. This poses a problem that decoding of B6 requires a memory to process four pictures I1, P4, I7 and B6 and a remarkably larger volume of data must be processed. For this reason, a multi-viewpoint video transmission/display system which displays pictures while varying viewpoints in real time on the receiving side has not been realized. This problem occurs because the conventional video encoding method is designed to play back forward in the time direction but not to play back reversely or backward frame by frame.

The method described in the above Patent Document 1 also has a problem that forward predicted frames cannot be used and many intra-coded frames must be used to maintain the picture quality at a prescribed level or higher and a very large volume of data must be handled. Therefore, this method is not suitable for multi-viewpoint video transmission as mentioned above.

In view of the above conventional technique, the present invention provides a bit stream which can be played back reversely frame by frame with high picture quality and high coding efficiency, and a video encoder and a video decoder which cope with it. Also, the present invention is suitable for multi-viewpoint video encoding and provides a multi-viewpoint video bit stream, a video encoder and a video decoder which take advantage of this feature.

DISCLOSURE OF THE INVENTION (Solution)

In order to address the above problems, this application discloses the following typical constitutions.

A recording medium in which a plurality of frames are each coded as picture data and a bit stream having, for one frame, picture data predicted forward from another one of the frames, and picture data predicted in a direction reverse to the forward prediction, or backward from another one of the frames is recorded.

A video encoder which includes: a picture memory which can store a plurality of input pictures; a processing direction determination section which determines a picture processing order; and a prediction section which performs predictive processing, wherein the prediction section switches input from the reference pictures for a frame to be coded, between a past reference picture and a future reference picture according to an instruction from the processing direction determination section. Also, a video decoder which receives a bit stream having a flag for distinguishing, for one picture, between picture data generated by forward prediction and picture data generated by prediction in a direction reverse to the forward prediction, or backward prediction and decodes the bit stream according to an instruction from the processing direction determination section for determining the processing direction.

According to the present invention, it is possible to provide a bit stream which can be played back reversely frame by frame with high picture quality and high coding efficiency. In addition, a video encoder and a video decoder which cope with it can be realized. Also, it is possible to realize a bit stream, a video encoder and a video decoder which are suitable for multi-viewpoint video coding.

BEST MODE FOR CARRYING OUT THE INVENTION

First Embodiment

An embodiment of the present invention will be described referring to the accompanying drawings.

Figure 1:
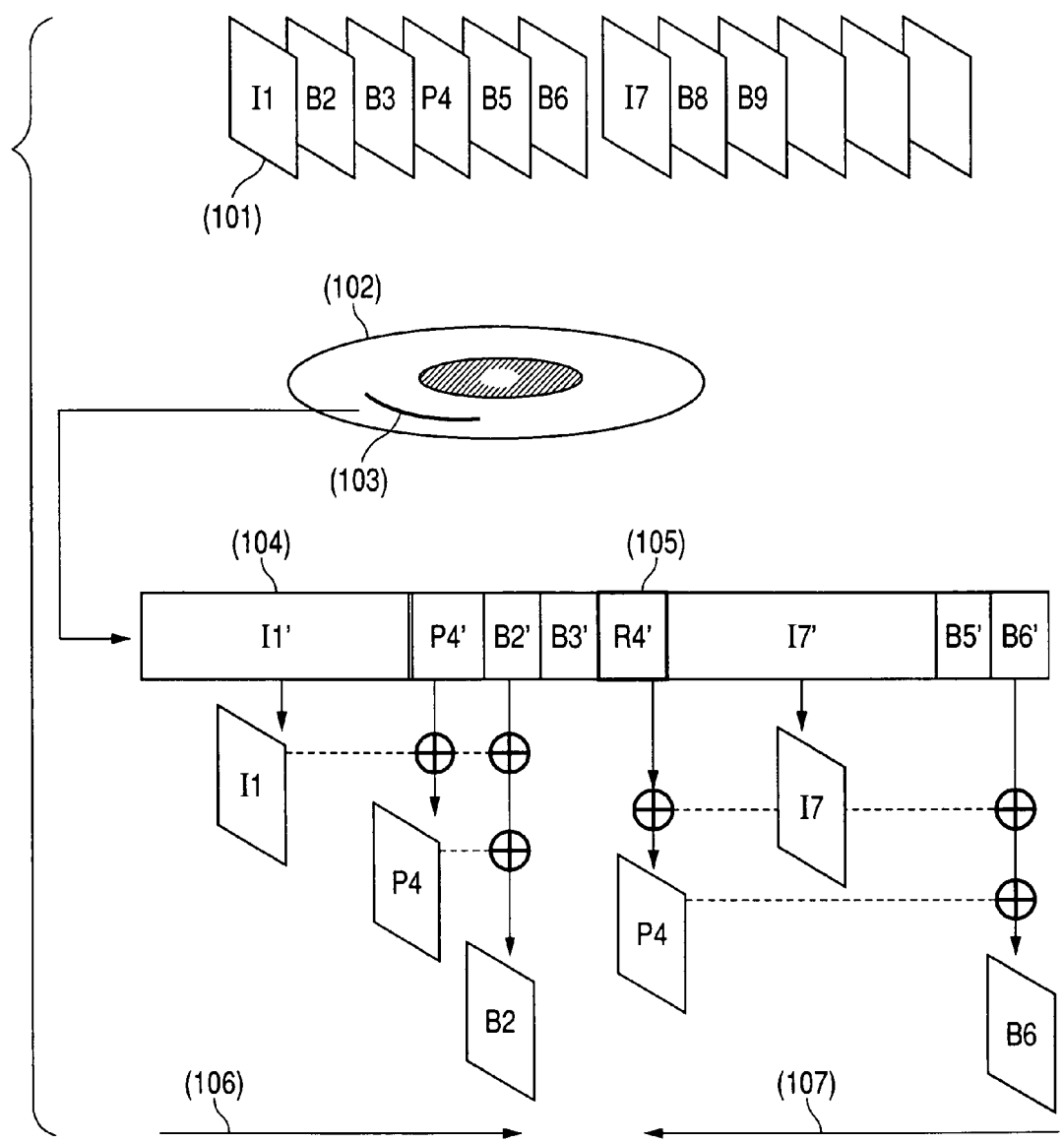
FIG. 1 illustrates a bit stream according to one embodiment of the present invention.

A bit stream according to an embodiment of the present invention is shown in FIG. 1 and its feature will be explained next.

An explanation is given using a bit stream (104) in a coded form of a string of original pictures (101). The bit stream is recorded as a data string (103) in a data recording medium (102). In the string of original pictures, I represents an intra-coded frame, P a forward predicted frame, and B a bi-directional predicted frame. Numbers represent frame numbers in playback. In the bit stream (104), I1' represents data as I1 in coded form. For P and B, "'" indicates data as pictures in coded form after forward prediction and bi-directional prediction respectively. Hereinafter, the meanings of reference numerals and symbols are the same as above. Arrow 106 represents the direction of forward playback and arrow 107 the direction of reverse playback.

First, how to play back the bit stream (104) forward in the order of I1-B2-B3-P4 is explained. Since I1' is intra-coded, it is decoded by itself and I1 is played back. Next, since P4' is forward predictive-coded, P4 is played back from I1 and P4' data. Since B2' is bi-directional predictive-coded, B2 is played back from I1, P4 and B2' data. B3 is also played back similarly. Playback is thus made by reading data for up to three relevant pictures.

Next, how to play back reversely in the order of I7-B6-B5-P4 is explained. This application features the use of a backward predicted frame R4'. A backward predicted frame means a frame which is predicted only by reference to a frame to be played back later in the normal playback order (time order). Specifically this embodiment is characterized in that picture data P4' generated by forward prediction and picture data P4' generated by prediction in a direction reverse to forward prediction or backward prediction are included for picture P4. I7' is decoded by itself to play back I7. Next, P4 cannot be played back without using I1 and P4' in the conventional method. On the other hand, in the present invention, backward predicted picture data R4' (105) is available. It is picture data obtained by backward prediction of P4 from I7. In other words, P4 can be played back using decoded picture I7 and R4' data. Next, B6 and B5 can be played back using B6' and B5' respectively as well as I7 and P4. Thus, in this application, for one frame, picture data P only consisting of data predicted from another frame forward in the time direction or viewpoint shift direction and picture data R only consisting of data predicted from another frame backward in the time direction or viewpoint shift direction are available. This means that while the conventional method requires a large volume of memory for reverse playback, the use of a bit stream in the present invention makes it easy to play back reversely on a frame-by-frame basis by processing a smaller amount of data with a smaller volume of memory. This method ensures high picture quality due to the use of frames predicted in both directions and has an advantage in that the volume of bit data is smaller than in the case of using intra-coded frames. Picture data R4' does not exist in a conventional stream. Therefore, this backward predicted frame data may be recorded in a private data format in which data is recorded as additional information to a conventional stream. The private data format refers to a data format which ensures interoperability between an existing specification and an extended specification and is also called additional data. Generally, specifications include information which indicates the range of private data and a decoder which only conforms to an existing specification ignores private data. A decoder which conforms to an extended specification can read private data and process it. The use of this format enables this stream to be played back forward as an ordinary stream even when it is entered into a conventional decoder which can not cope with reverse playback.

Figure 2A:
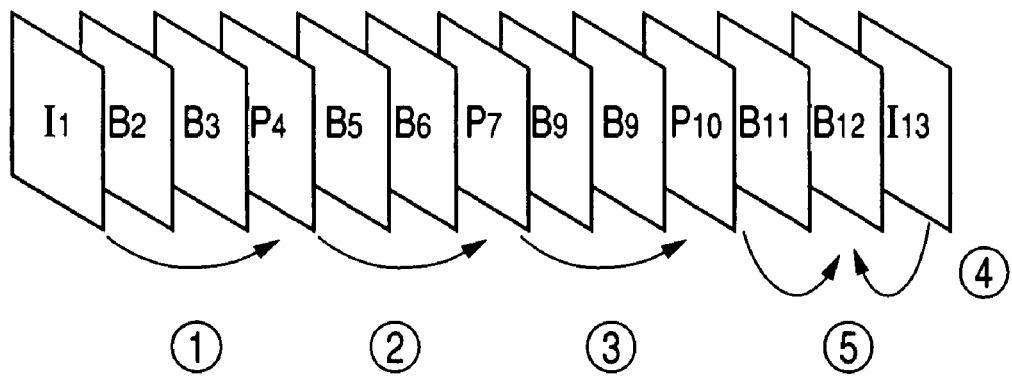
FIGS. 2A and 2B compare the conventional decoding method and a decoding method according to the present invention.

The difference between the method according to the present invention and the conventional method will be explained next referring to FIGS. 2A and 2B.

Let's consider the case of playing back B12 on the assumption that I13, B12, B11 and P10 are to be played back reversely in the order of mention. In order to play back B12, I13 and P10 must be decoded and the conventional method as shown in FIG. 2A requires five steps: for the purpose of playing back P10, a step of predicting and decoding P4 from I1: a step of predicting and decoding P7 from P4 and a step of predicting and decoding P10 from P7, and a step of decoding I13 by itself, and lastly a step of decoding B12 from I13 and P10. This means that a memory for storing such data must be provided.

Figure 2B:
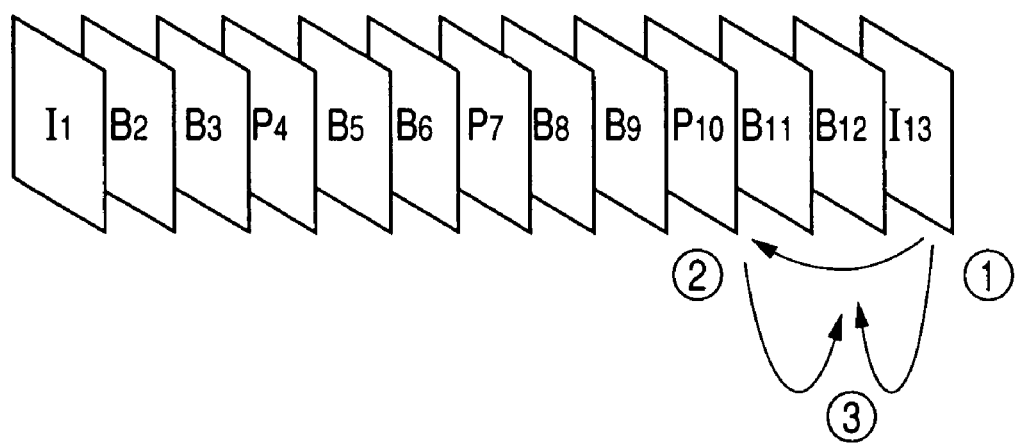

On the other hand, the proposed method as shown in FIG. 2B enables decoding of P10 from I13 using a backward predicted picture and only requires three steps, namely a step of decoding I13 by itself, a step of predicting and decoding P10 from I13, and a step of decoding B12 from I13 and P10, so that the volume of data to be processed and the required volume of memory are smaller than in the conventional method.

Next, a multi-viewpoint video capturing and recording system as an embodiment to which this application is applied will be explained referring to FIGS. 3A and 3B.

Figure 3A:
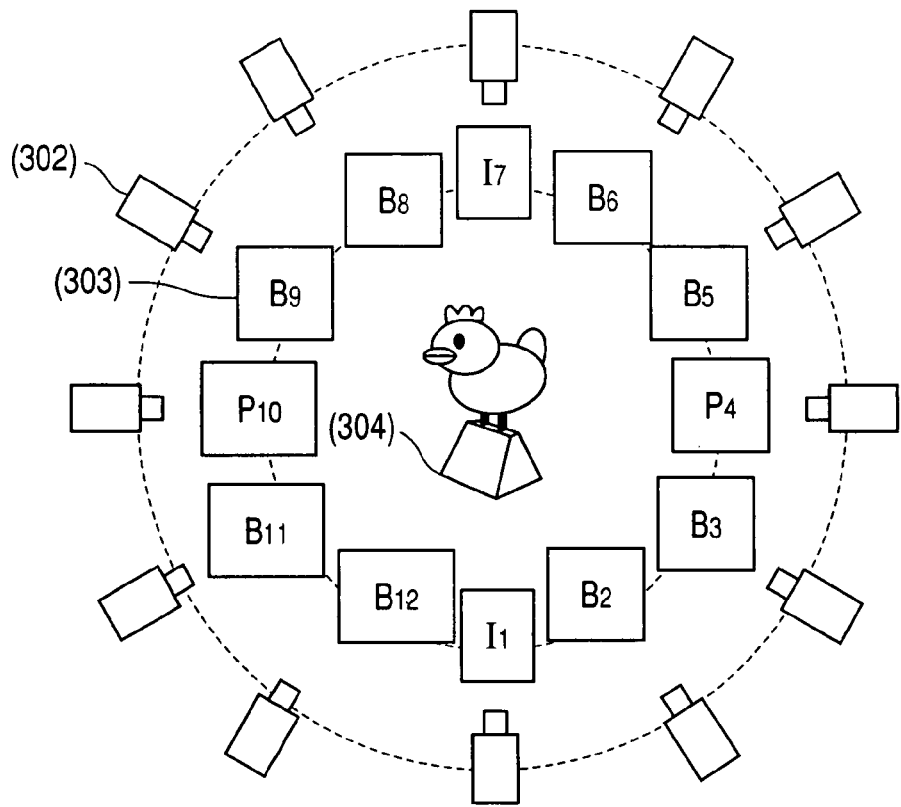
FIGS. 3A and 3B show a multi-viewpoint video capturing system.
Figure 3B:
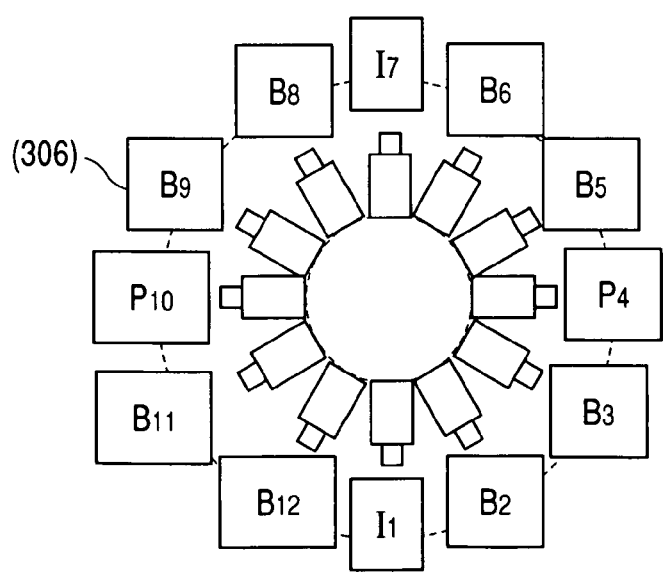

In one type of multi-viewpoint video capturing system, a camera (302) or the like is positioned so as to surround an object (304) to be captured as shown in FIG. 3A, and in another type, a camera is oriented outward to take an all-around panoramic video as shown in FIG. 3B. (303) and (306) in FIGS. 3A and 3B represent coded forms of pictures to be taken by the camera respectively. In transmission of a multi-viewpoint video like this, pictures are predicted and coded based on the correlation between neighboring viewpoints for data compression. Concretely, consecutive frames are captured in the order from I1 to B12, starting from a certain frame, in a way to make a full circle and each picture is intra predictive-coded, forward predictive-coded or bi-directional predictive-coded. It is also possible that after prediction between viewpoints, prediction is made in the time direction for each viewpoint. This is done when the object is to be recorded as a moving picture. The procedure is as follows: first, the picture at each viewpoint is coded by the above procedure. Then, with a coded picture as a reference frame, a picture at each viewpoint is independently predicted and coded in the time direction as a moving picture. By taking this procedure at regular time intervals, a multi-viewpoint video is recorded. However, shift from one viewpoint to another is made only at the time of predictive coding between viewpoints.

Figure 4:
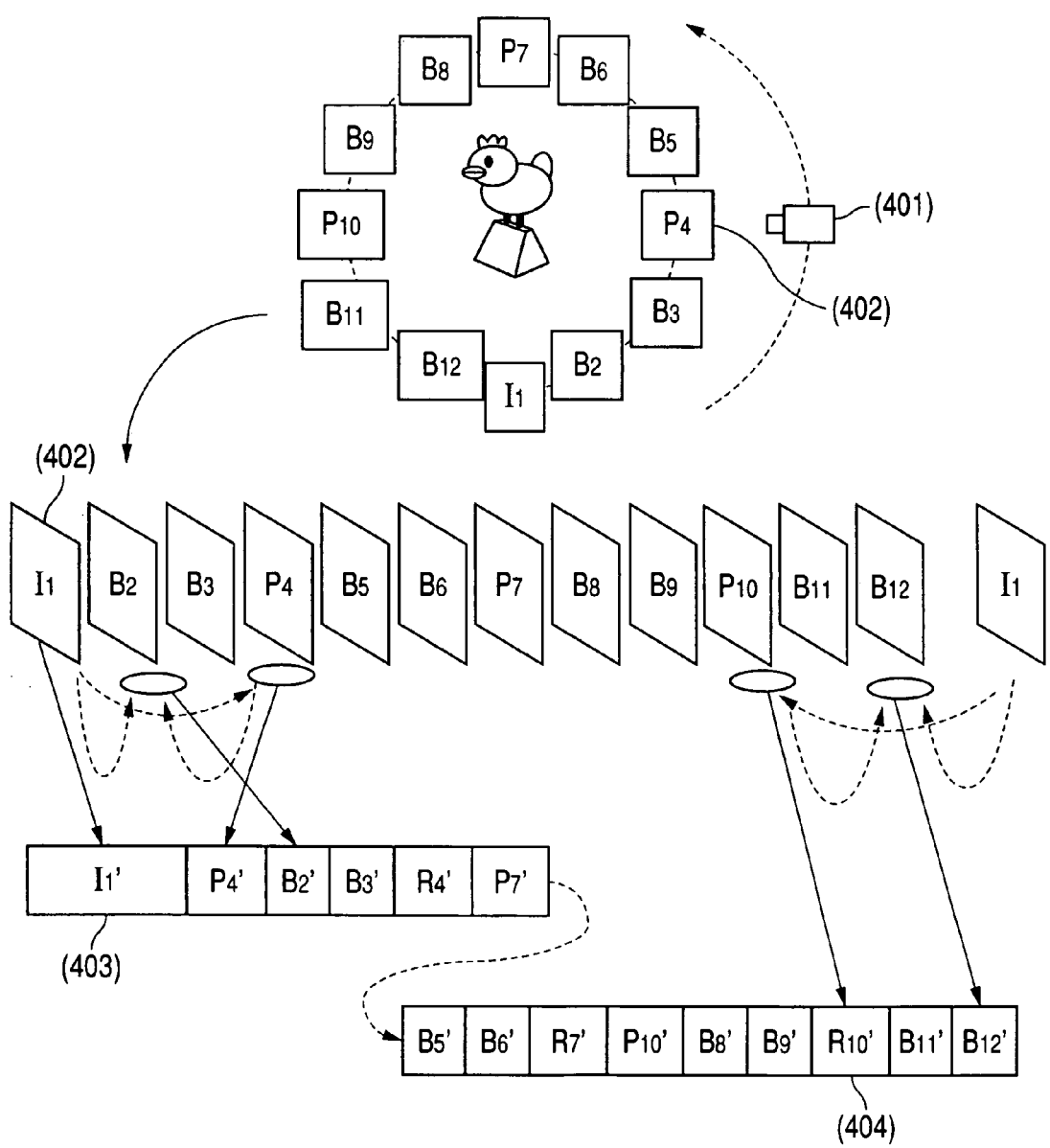
FIG. 4 illustrates an embodiment which uses a bit stream for multi-viewpoint video encoding according to the present invention.

FIG. 4 illustrates that a bit stream according to the present invention is used for multi-viewpoint video coding.

As described above, in the multi-viewpoint video capturing system, a camera (401) at each of a plurality of viewpoints or a moving camera takes a picture (402) corresponding to each viewpoint and these pictures are predictive-coded as consecutive frames to create a bit stream (403). On the side which receives the stream and plays it back, it must be possible to play back the pictures not only in the coding direction (clockwise or forward) but also reversely (counterclockwise) according to a user instruction so that the user can look around the object. As described above, while the conventional method requires processing of a large volume of data or the use of a large volume of memory in order to play back reversely, the method according to the present invention, which uses backward predicted picture R10' (404), substantially reduces such requirement and makes reverse playback easily.

A multi-viewpoint video bit stream according to the present invention may include not time information but viewpoint information in the time stamp field in which a conventional bit stream would include playback time information. For example, viewpoint index, camera angle, absolute position, display duration of the frame at each viewpoint or the like may be recorded there. Also, a flag indicating inclusion of such information other than playback time information may be recorded in the stream. When viewpoint index, camera angle, and absolute position are recorded, if the user specifies in which direction he/she wishes to look at the object, the frame which best meets the user request can be selected from the stream for display, on the basis of the above information. Also, when the display duration of the frame at each viewpoint is recorded, pictures obtained when the object is looked around are automatically played back. Since this type of information is described in a description format different from that for time stamp information which conforms to an existing specification, a flag indicating the inclusion of a different type of information should be recorded in the stream.

When a multi-viewpoint video bit stream is to be played back while the viewpoint is varied according to a user instruction as mentioned above, in case of reverse playback, after playback of the first coded frame in the stream, the last coded frame may be played back. Since the order of playback like this needs a special playback method, some types of decoder require a flag for distinguishing it from a conventional stream. It may be possible that a flag indicating that reverse loop playback is possible is recorded in the stream and in the presence of this flag, after the last frame at either end among consecutive frames (for example, B12 in this embodiment) is played back, the other end frame (I1) is played back successively.

Figure 5:
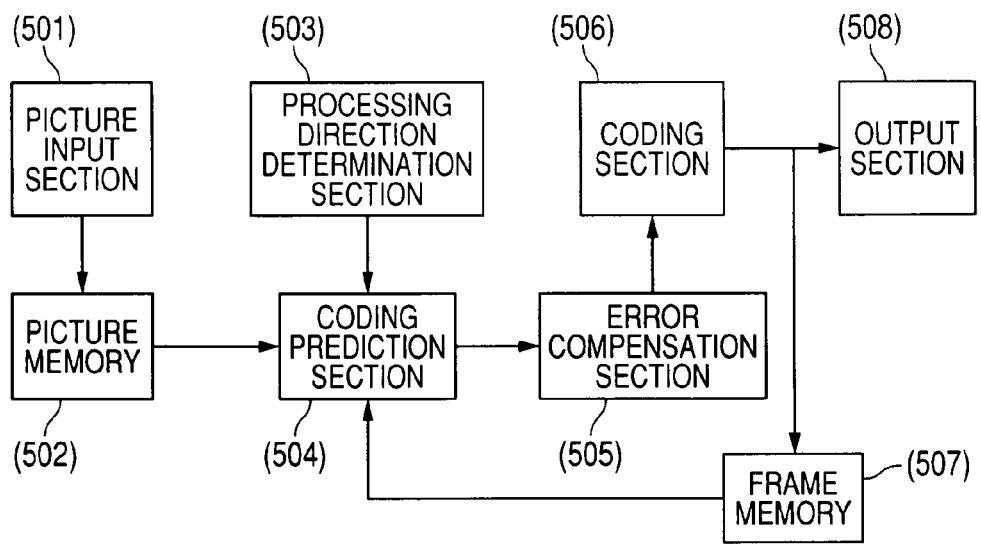
FIG. 5 illustrates a video encoder according to an embodiment of the present invention.

FIG. 5 shows a video encoder according to an embodiment of the present invention.

The video encoder includes a picture input section (501), a picture memory (502), a processing direction determination section (503), a coding prediction section (504), an error compensation section (505), a coding section (506), a frame memory (507), and an output section (508). The error compensation section (505) improves the picture quality though it can be omitted.

First, picture information is entered from a camera, etc. into the encoder through the picture input section (501) and stored in the picture memory (502). Pictures may be captured simultaneously from a plurality of cameras or successively entered and stored. Then, the processing direction determination section (503) determines the order of picture processing and the coding method such as forward prediction or backward prediction and sends an instruction to the coding prediction section (504). The prediction section (504) acquires appropriate picture data from the picture memory (502) according to the instruction and performs predictive processing using a reference picture from the frame memory (507). While predictive coding of each picture takes place in the coding prediction section (504), a difference may arise in decoded picture quality between playback directions in case of a picture like P4 in the embodiment of FIG. 4, for which two types of data, forward predicted picture data P4' and backward predicted picture data R4', are generated. When bi-directional predicted pictures are used, a picture quality difference may arise between the playback directions if there is a difference in reference picture quality because the same data is used for both forward and backward playback. In order to avoid this, the video encoder according to the present invention uses the error compensation section (505) to compensate for the picture quality difference between playback directions. The forward predicted picture data and the backward predicted picture data are once decoded and their picture qualities are compared block by block, and for a block where the quality difference exceeds a given level, the block for one picture or both pictures should be re-encoded after parameter adjustment. Then, the coding section (506) encodes pictures on the basis of predicted information and sends the resulting data to the output section (508) to make a bit stream. In addition, the coding section (506) decodes the bit data thus generated to decode it into a picture and send it to the frame memory (507). The picture stored in the frame memory (507) is saved as a reference frame which will be used for prediction of a next picture by the coding prediction section (504).

Figure 6:
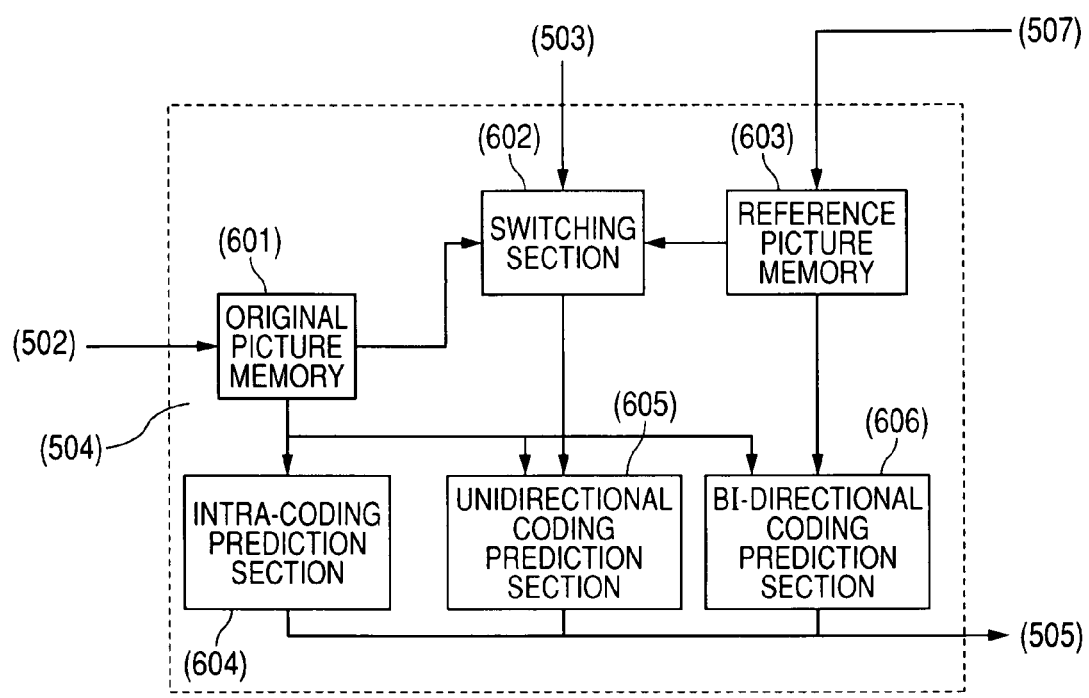
FIG. 6 illustrates details of a video encoder according to an embodiment of the present invention.

Next, the video encoder as an embodiment will be detailed referring to FIG. 6. FIG. 6 shows details of the coding prediction section (504).

First, an original picture to be coded is taken from the picture memory (502) into an original picture memory (601). A reference picture is taken from the frame memory (507) into a reference picture memory (603). Then, an instruction concerning the coding method including the picture prediction method and the type of prediction to be used is sent from the processing direction determination section (503) to a switching section (602) and according to this instruction, the reference picture and the original picture are sent to prediction sections: an intra-coding prediction section (604), a unidirectional coding prediction section (605) and a bi-directional coding section (606). The intra-coding prediction section (604) is a processor which performs prediction inside a picture for coding and the unidirectional coding prediction section (605) performs forward or backward (reverse) prediction for coding. The bi-directional coding prediction section (606) performs prediction in both directions for coding. In other words, since forward prediction and backward prediction are both unidirectional prediction, the same unidirectional coding prediction section (605) can perform predictive processing in both directions provided that the switching section (602) changes the reference picture for use in prediction. This means that switching is required only for backward predictive coding. The reference picture memory includes a past picture memory and a future picture memory and the past picture memory is used for forward prediction and both the memories are used for bi-directional prediction. Although backward prediction only requires the future picture memory, a reference picture which should be primarily stored in the future picture memory is stored in the past picture memory by a switching process so that the same process may be used as in forward prediction. Here, this application is embodied by the switching section which switches the reference picture used for prediction between the future picture and past picture for the picture to be coded. The data processed by the prediction sections is sent to the error compensation section (505). Coding is performed by taking the above procedure.

Figure 7:
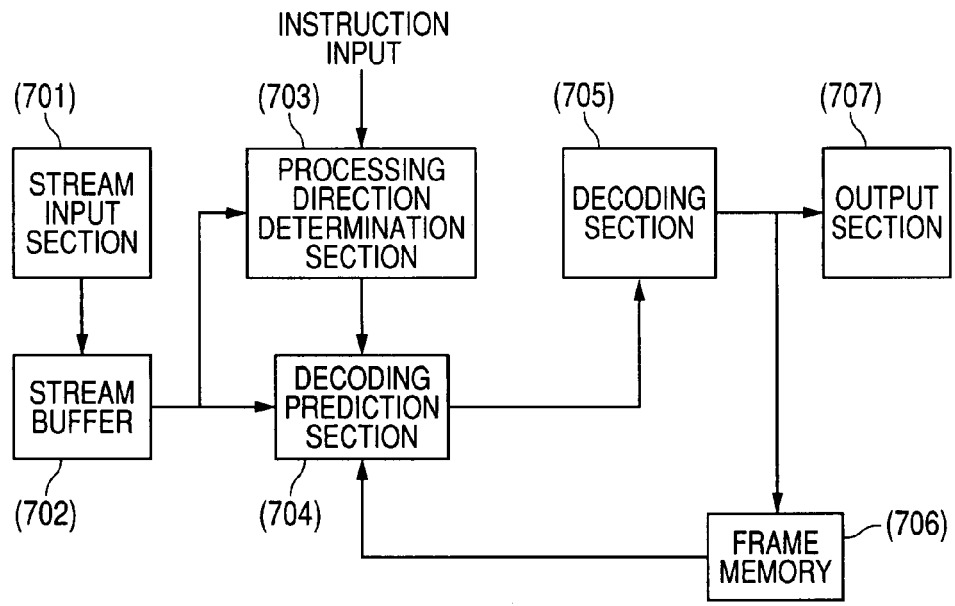
FIG. 7 illustrates a video decoder according to an embodiment of the present invention.

FIG. 7 shows a video decoder according to an embodiment of the present invention.

The video decoder includes a stream input section (701), a stream buffer (702), a processing direction determination section (703), a decoding prediction section (704), a decoding section (705), a frame memory (706), and an output section (707).

First, a bit stream is entered into the decoder through the stream input section (701) and stored in the stream buffer (702). Then, the processing direction determination section (703) determines the order of data to be processed according to an instruction given by the user and notifies the decoding prediction section (704) of it. In case of a decoder which plays back a multi-viewpoint video, the user may change the bit stream decoding direction in various ways to look around the object, for example, clockwise or counterclockwise. The processing direction determination section (703) specifies an appropriate picture data point according to a user instruction from data stored in the stream buffer (702) and notifies the decoding prediction section (704) of the order of decoding. Also the processing direction determination section (703) checks a flag in the stream and determines whether the input stream can be played back reversely or whether reverses loop playback as a multi-viewpoint video bit stream is possible.

Then, the decoding prediction section (704) acquires appropriate picture data from the stream buffer (702) according to the instruction and performs prediction processing. The decoding prediction section (704) may be the same as a prediction section in an ordinary decoder except that it should include a data and reference picture switching function. The predicted data is sent to the decoding section (705) where it is played back as a picture and sent to the output section (707). The decoded picture is sent to the frame memory (707) and stored as a reference picture for a picture to be decoded next.

Figure 8:
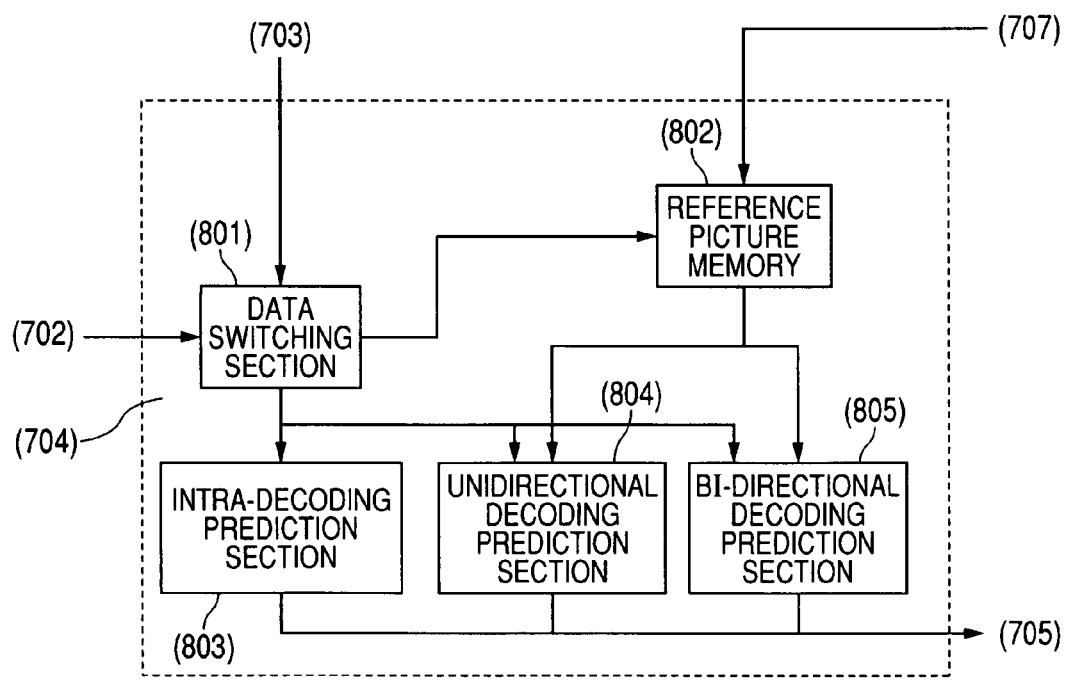
FIG. 8 illustrates details of a video decoder according to an embodiment of the present invention.

Next, the video decoder according to one embodiment of the present invention will be described in detail referring to FIG. 8. FIG. 8 shows details of the decoding prediction section (704).

First, picture data to be decoded is taken from the stream buffer (702) into a data switching section (801). A reference picture is taken from the frame memory (706) into a reference picture memory (802). Then, an instruction concerning the picture prediction method and the decoding method is sent from the processing direction determination section (703) to the data switching section (801) and according to this instruction, appropriate data is sent to prediction sections: an intra-decoding prediction section (803), a unidirectional decoding prediction section (804) and a bi-directional decoding section (805). The intra-decoding prediction section (803) is a processor which performs prediction inside a picture for decoding and the unidirectional decoding prediction section (804) performs forward or backward (reverse) prediction for decoding. The bi-directional coding prediction section (805) performs prediction in both directions for decoding. In other words, since forward prediction and backward prediction are both unidirectional prediction, the same unidirectional decoding prediction section (804) can perform predictive processing in both directions provided that the data switching section (801) changes the order of data and the reference picture as appropriate. The data processed by the prediction sections is sent to the decoding section (705). The above procedure is taken for decoding. As apparent from the above explanation, both an encoder and a decoder can be realized simply by slightly modifying existing devices.

Figure 9:
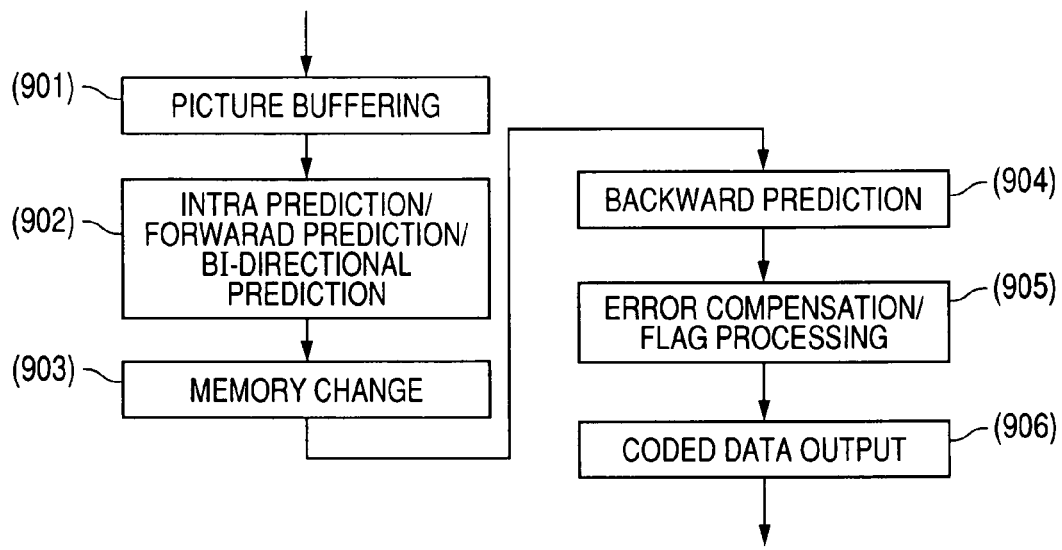
FIG. 9 illustrates a video encoding method according to the present invention.

Next, a video coding method according to the present invention, which is schematically shown in FIG. 9, will be described.

First, at Step (901), picture buffering is done. Here multi-viewpoint pictures or consecutive frames are taken into the memory. Then, at Step (902), intra-prediction, forward prediction, and bi-directional prediction are performed. This is the same as the conventional coding process and a step of generating the same picture data as a conventional bit stream. Then, at Step (903), the memory is changed. This is a process of changing the reference picture so that for creation of a stream which can be reversely played back, the same process can be used for reverse prediction as for forward prediction as described above. Then, at Step (904), backward prediction is performed. Here, picture data is generated only by backward prediction to enable reverse playback. Then, at Step (905), error compensation and flag processing are performed. As described above, error compensation is a process of compensating for the difference in coding between forward predicted picture data and backward predicted picture data in order to prevent a picture quality difference between forward playback and reverse playback. In flag processing, a flag indicating that an output bit stream can be played back reversely or, in case of a multi-viewpoint video bit stream, camera viewpoint information or information indicating that reverse loop playback is possible is outputted. Lastly, at Step (906), the coded data thus generated is outputted as a stream. As for the processing sequence, it is also possible that Step (902) for normal processing and Step (904) for reverse processing are performed concurrently by changing the memory. A stream which can be played back reversely is created in this way.

Figure 10:
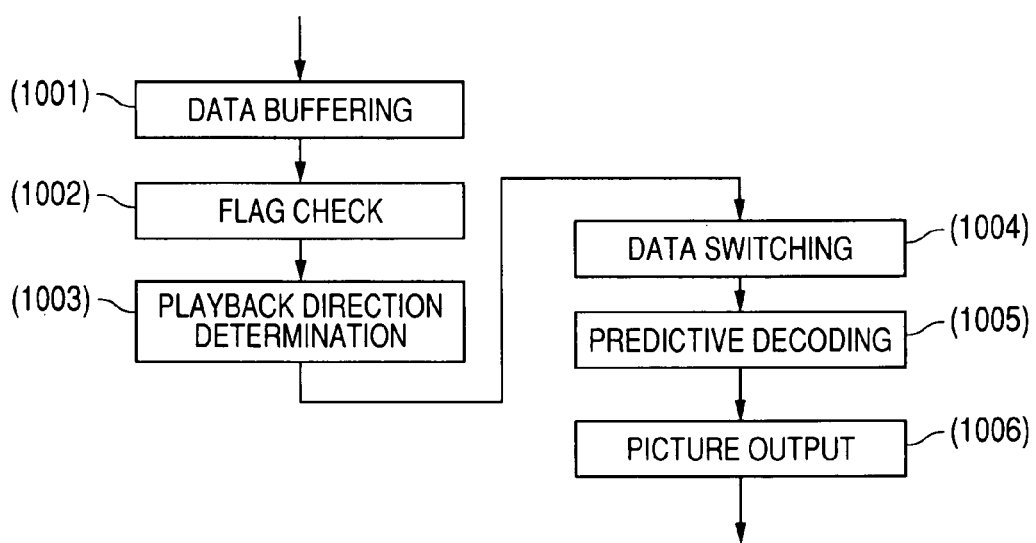
FIG. 10 illustrates a video decoding method according to the present invention.

Next, a video decoding method according to the present invention, which is schematically shown in FIG. 10, will be described.

First, at Step (1001), bit stream data buffering is done. Then, at Step (1002), bit stream flag check is done. Details of flags are as mentioned above. Then, at Step (1003), playback direction determination is performed. The playback direction which may be changed according to a user instruction is determined. Then, at Step (1004), data selection is made. Here, picture data corresponding to the playback direction is read from the memory in which data is stored, and the data is sent to the prediction section. Then, at Step (1005), predictive decoding is performed. Since data in a correct order is received from Step (1004), decoding is performed in the same way as in the conventional decoding process. Lastly, a decoded picture is outputted at Step (1006). In this way, a picture is played back from a stream which can be played back reversely.

A bit stream which can be played back frame by frame can be created, transmitted and played back by the abovementioned means. Also, a multi-viewpoint video encoder and a multi-viewpoint video decoder which use the means can be realized.

Although a multi-viewpoint video encoder and a multi-viewpoint video decoder are illustrated by example in the above embodiment, the present invention is not limited thereto but it may be applied to a variety of video encoders and video decoders including those for ordinary moving pictures. When this method is used for coding ordinary moving pictures, frame-by-frame reverse playback can be done using a smaller volume of memory; and when it is used for multi-viewpoint video coding, viewpoint shift can be freely done according to a user instruction using a smaller volume of memory.

The embodiment described in this application may be defined by a program which a computer loads and executes, and may be implemented in combination with hardware or by hardware on its own.

INDUSTRIAL APPLICABILITY

This application may be applied to data encoding and decoding.

The invention claimed is:

1. A non-transitory tangible machine-readable recording medium bearing a recorded bit stream of picture data as a plurality of frames in coded form, wherein:
the bit stream has, for a first frame of the frames, first picture data generated by only forward prediction from a second frame, and for the first frame, second picture data generated by only backward prediction from a third frame, and
the order of picture data in the bit stream is such an order that the first picture data and the second picture data are both positioned after picture data for the second frame and before picture data for the third frame.

2. The recording medium according to claim 1,
wherein the bit stream at least has either one of time stamp information showing playback time of each of the frames and capturing position information of each of the frames.

3. The recording medium according to claim 1,
wherein the bit stream further has a flag indicating that it is possible to play back, after playback of the last frame of the plural frames, the first frame, or play back, after playback of the first frame, the last frame.

4. A video encoder, comprising:
a picture memory that can store a plurality of input pictures;
a processing direction determination section that determines a picture processing order;
a prediction section that performs predictive processing using the input pictures and reference pictures to generate picture data for the input pictures; and
an output section that outputs a bit stream generated using the picture data,
wherein the prediction section has a reference picture memory for storing the reference pictures and a switching section for changing input from the reference pictures according to an instruction from the processing direction determination section, and the switching section switches input from the reference pictures for a frame to be coded, between a past reference picture and a future reference picture, and generates, for one picture, first picture data generated by only forward prediction using the past reference picture, and second picture data generated by only backward prediction, using the future reference picture, and
wherein the order of picture data in the bit stream is such an order that the first picture data and the second picture data are both positioned after picture data for a frame corresponding to the past reference picture and before picture data for a frame corresponding to the future reference picture.

5. The video encoder according to claim 4,
wherein the bit stream at least has either one of time stamp information showing playback time of each of the frames and capturing position information of each of the frames.

6. The recording medium according to claim 1,
wherein the order of picture data in the bit stream is such an order that the first picture data is positioned before the second picture data.

7. The recording medium according to claim 6, wherein the bit stream further has a flag indicating that the first picture data and the second picture data are included for the first frame.

8. The video encoder according to claim 4,
wherein the order of picture data in the bit stream is such an order that the first picture data is positioned before the second picture data.

9. The video encoder according to claim 8,
wherein the bit stream further has a flag indicating that the first picture data and the second picture data are included for the first frame.

10. The video encoder according to claim 4,
wherein the bit stream further has a flag indicating that it is possible to play back, after playback of the last frame of the plural frames, the first frame, or play back, after playback of the first frame, the last frame.

11. The recording medium according to claim 1, wherein:
the first picture data is picture data for normal play back, not for reverse play back, and
the second picture data is picture data for reverse play back, not for normal play back.

12. The video encoder according to claim 1, wherein:
the first picture data is picture data for normal play back, not for reverse play back, and
the second picture data is picture data for reverse play back, not for normal play back.

* * * * *